United States Patent [19]
Nakano

[11] Patent Number: 5,716,734
[45] Date of Patent: Feb. 10, 1998

[54] POCKET TYPE SEPARATOR FOR ELECTRODE PLATE OF STORAGE BATTERY

[75] Inventor: Kenji Nakano, Iwaki, Japan

[73] Assignee: Furukawa Denchi Kabushiki Kaisha, Yokohama, Japan

[21] Appl. No.: 967,063

[22] Filed: Oct. 28, 1992

[30] Foreign Application Priority Data

Nov. 6, 1991 [JP] Japan ................ 3-109387 U

[51] Int. Cl.⁶ ................................ H01M 2/18
[52] U.S. Cl. ................................ 429/143; 429/136
[58] Field of Search ................ 429/136, 143, 429/145

[56] References Cited

U.S. PATENT DOCUMENTS 4,041,218   8/1977   Axelrod et al. .................. 429/136

OTHER PUBLICATIONS

Saitou Shinji, Patent Abstracts of Japan, vol. 7, No. 288 (E–218) Dec. 22, 1983 & JP–A–58 165 245, (Abstract).
Shiotani Hrioshi, Patent Abstracts of Japan, vol. 7, No. 45 (E–160) Dec. 2, 1982 & JP–A–57 196 474, (Abstract).

*Primary Examiner*—M. Nuzzolillo
*Attorney, Agent, or Firm*—Armstrong, Westerman, Hattori, McLeland & Naughton

[57] ABSTRACT

A pocket type separator for an electrode of storage battery, such separator having a bottom, closed left and right side edges and an open top side. The inner surfaces of front and rear sides of the pocket facing each other include a plurality of parallel, vertical, widthwise spaced ribs in middle regions constituting most of the facing surfacer and a plurality of intersectant vertically spaced ribs on the Widthwise left and right side end portions of the facing surfaces and intersecting front and rear corner edge portion of opposite side edges of an electrode plate contained in the packet type separator.

3 Claims, 4 Drawing Sheets

POCKET TYPE SEPARATOR FOR ELECTRODE PLATE OF STORAGE BATTERY

FIELD OF THE INVENTION

This invention relates to a pocket type separator for an electrode plate of a storage battery.

BACKGROUND

In general, a conventional pocket type separator for an electrode plate of a storage battery is constructed by forming a synthetic resin material, such as super molecular weight polyethylene, polyvinyl chloride, or the like, into a porous sheet, and cutting the porous sheet into a predetermined length to form a predetermined sized rectangular sheet. The sheet is bent and folded and the side edges of the folded sheet are sealed by means of an ultrasonic sealing or a mechanical sealing process so as to obtain a pocket type separator having a bottom, left and right closed sides with the top edge open. A positive electrode plate for a lead-acid storage battery is inserted through the open top, and a plurality of such positive electrodes, contained in their respective separators, together with a plurality of negative electrode plates, are assembled into a cell assembly of the lead-acid storage battery.

However, when such pocket type separator is in Use in such storage battery, the inner surfaces of the two mutually facing sheet-made sides of the pocket type separator are directly in contact with the front and rear side surfaces of the positive electrode plate, so that, while in use, they become oxidized by nascent oxygen generated from the positive plates during charging and are thus worn off. In addition, the negative electrode plate, that has become warped, presses the positive electrode plate with the negative plate's warped portions to eventually make holes in the sheet-made sides of the separator. When this takes place, a short-circuiting between the positive plate inside the separator and the negative plate outside can easily result. All of this combines to make the battery life shortened.

In order to remove these problems, it has been proposed to provide the inner surfaces of the mutually facing sheet-made sides of the pocket type separator with a plurality of parallel vertical ribs formed so as to be projecting from the base faces of the sheet-made sides and arranged in the widthwise direction, whereby the front and rear side surfaces of the positive electrode plate contained in the pocket type separator are in contact with the parallel vertical ribs and thus are prevented, as much as possible, from directly contacting the base faces of the sheet-made sides of the separator to prevent deterioration and wear of the separator resulting from oxidation.

With the above-mentioned preventive means, however, it has been observed that the angular corner edges, formed by the front and rear surfaces and the left and right side surfaces of the electrode plate are not prevented from crossing one another and coming in direct contact with the base faces of the mutually facing sheet-made sides of the separator. Especially when the electrode plate becomes warped or expanded during use, the warped, or expanded, electrode plate unduly press the base faces of the separator, thereby causing oxidation, injury, breakage and holes in the separator and end up with short-circuiting of the positive and negative plates.

It has also been proposed to provide the inner surfaces of the two mutually facing sheet-made sides of the separator with a plurality of parallel, but slant ribs devised for securely holding both sides of the positive electrode plate contained in the separator and preventing the active material from falling off therefrom. In the case of this pocket type separator, because such plural parallel slant ribs are provided on the inner surfaces of the front and rear sides of the separator so as to extend from the folded bottom edge to both side edges thereof, gas generated in the separator cannot go out smoothly through the open top and is held up in the separator. Such gas works against effective distribution, permeation and diffusion of the electrolyte into the electrode plate and resulting in lowering of the battery performance.

SUMMARY OF THE INVENTION

The object of the present invention is to provide a pocket type separator for an electrode plate of storage battery which is free from the above-mentioned inconveniences experienced with conventional types of the pocket type separator, and which is of such type that it is formed to have the bottom, left and right side edges closed and the top side open, and is characterized in that the inner surfaces of the mutually facing sheet-made sides of the separator are provided with a plurality of parallel, vertical ribs on the middle region constituting most of the widthwise portion thereof where the electrode plate contained in the separator is held from both sides with said inner surfaces. There are further provided, on the widthwise left and right side end portions of said inner surfaces, a plurality of intersecting ribs arranged in such a way that they are spaced from each other, in the vertical direction, and intersect the front and rear corner edge portions of the side edges of the electrode plate contained therein.

DETAILED DESCRIPTION OF THE INVENTION

In the following, embodiments of the present invention will be described in detail with reference to the accompanying drawings.

Figure 1:
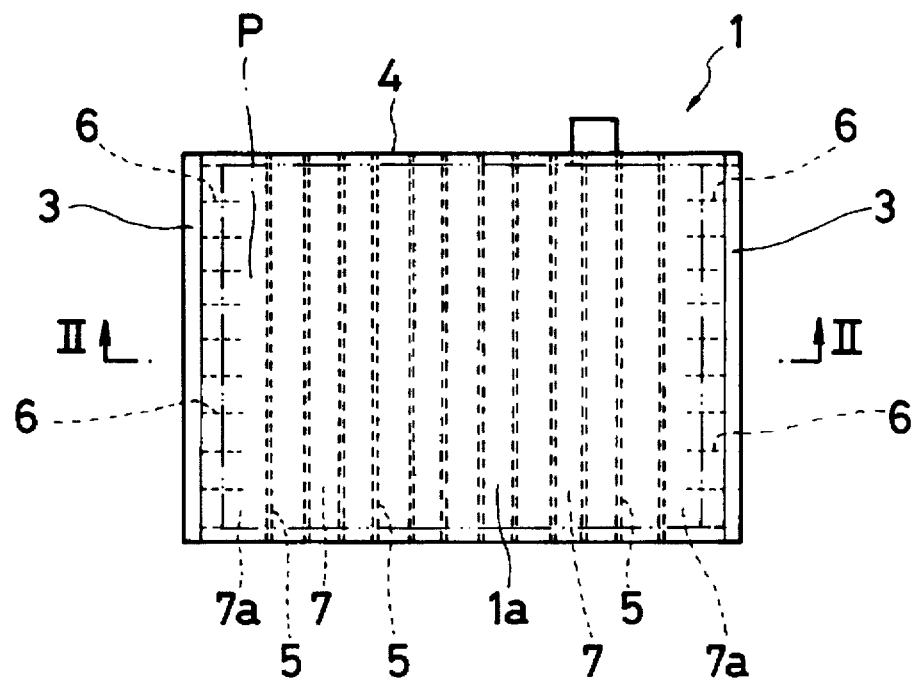
FIG. 1 is a front view of one embodiment of the pocket type separator for an electrode plate of a storage battery according to the present invention.
Figure 2:
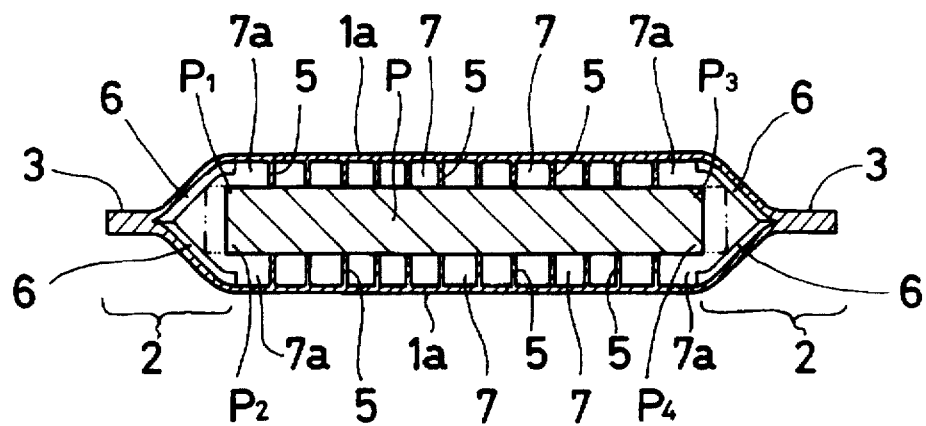
FIG. 2 is a front view of one embodiment of the pocket type separator for an electrode plate of a storage battery according to the present invention.
Figure 3:
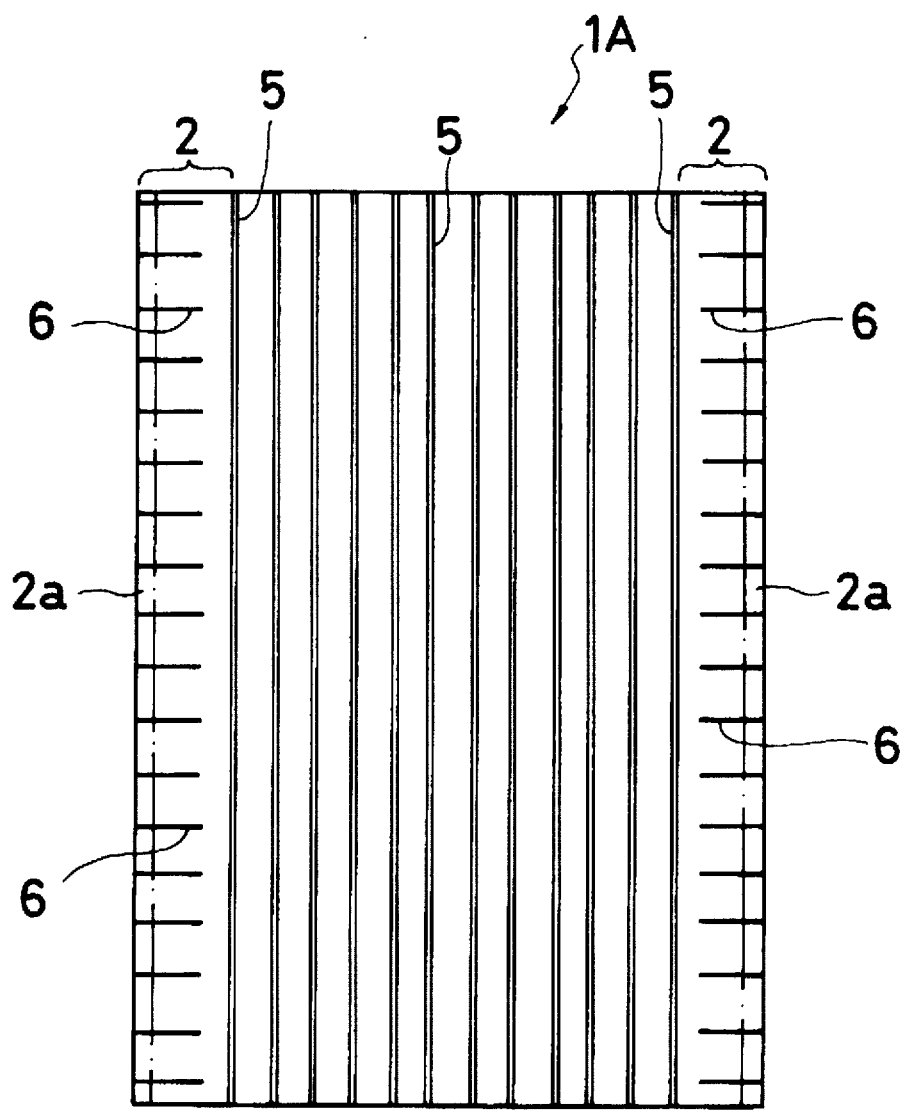
FIG. 3 is a development of the pocket type separator shown in FIG. 1, before folding and sealing of the separator.

The pocket type separator, according to the present invention as shown in FIGS. 1 and 2, and denoted by reference numeral 1, is manufactured basically as follows:

Synthetic resin, such as super molecular weight polyethylene or polyvinyl chloride, alone, or a mixture of synthetic resin with inorganic powder and a pore-forming agent, is molded into a belt-like sheet by means of a molding machine, such as an extruder. The pore-forming agent is then extracted from the molded sheet by means of a solvent. The sheet is thereafter dried, so that a porous belt-like sheet is obtained. The porous sheet is cut into a number of pieces of a predetermined length and in a rectangular shape. The resultant sheet separator 1A, shown in FIG. 3, represents one such sheet. The sheet separator 1A is then folded at the middle, forming two mutually facing sides with side end portions 2, 2 formed on the left and right sides of the folded sheet separator 1A and sealed together at mutually facing surfaces of the margins 2a, 2a of a predetermined width by heat-sealing, such as ultrasonic or mechanical sealing. The sealed portions 3, 3, as shown in FIGS. 1 and 2, are formed on opposite side edges of the resultant pocket type separator 1 with the bottom edge formed by the above mentioned folding and the left and right side edges 2, 2 closed, and with an opened to portion 4 formed at the top side thereof. The above, folded construction of the pocket type separator is not substantially different from the folding of a conventional pocket type separator.

The pocket type separator 1, according to the present invention, is formed so as to have plurality of parallel, vertical, projecting ribs 5,5,5, . . . provided on the middle region of the inner facing surfaces, excluding the left and right marginal edge portions 2, 2. Ribs 5, 5 are arranged so as to extent vertically for the full length and to be spaced from each other in the widthwise or lateral direction at predetermined intervals. On the left and right side end portions 2, 2 there are provided short, intersectant ribs 6,6,6, . . . arranged at predetermined intervals in the vertical direction of portions 2, 2 and formed to extend in the lateral direction to intersect both side edges of an electrode plate which is contained in the pocket type separator, as will be discussed later. The sheet separator 1A, thus formed, is folded at its middle and sealed at its left and right, marginal edges to make up the pocket type separator 1 according to the present invention.

More specifically, the pocket type separator 1, according to the present invention, is of the porous sheet, folded into a U-shaped structure, and has, on the middle regions of the inner surfaces of the two mutually facing front and rear sheet-made sides 1a, 1a, a plurality of parallel vertical ribs 5, 5, 5, . . . arranged thereon, as shown in FIG. 1, so as to space from both front and rear sides, an electrode plate P, usually a positive electrode, p, to be contained therein. Along the left and right marginal regions of the inner surfaces, a plurality of short, intersectant ribs are arranged so as to intersect both side edges of the electrode plate P. More particularly, the plurality of short intersectant ribs 6,6,6, . . . are lined up along each side of the middle regions in such a way that the short intersectant ribs are spaced from each other in the vertical direction of the separator and intersect the corner edge portions P1,P2 and P3,P4.

Generally, it is preferable that the above mentioned intersectant rib 6 be lower in height than the vertical rib 5. By this arrangement, the overall thickness of the pocket portion of the separator, with an electrode plate contained therein, can be reduced to a possible minimum especially at both the left and right side end portions 2, 2 thereof, such reduction in size being quite desirable. For instance, it is general and considered desirable that the intersectant rib 6 be about 0.5 mm, or less, in height while the vertical rib 5 are about 1 mm in height.

The pocket type separator 1 is used in such a manner that a positive plate P is put therein and a desired number of the resultant separator-contained positive plates and a predetermined number of a negative electrode plate are stacked, one upon another, so that a cell assembly may be assembled, in a conventional assembling manner, for use in manufacturing a lead-acid storage battery. In this case, the plurality of the vertical ribs 5,5,5, . . . , arranged likewise on either of the inner surfaces of the mutually facing front and rear sheet-made sides of the pocket type separator 1, come in contact, respectively, with the front and rear surfaces of the electrode plate P. This arrangement not only serves to prevent the middle regions of the inner base faces of the front and rear sheet-made sides 1a, 1a of the separator from being directly contacted by both side surfaces of the plate P and, thus, effectively protect the separator bases or the sheet-made sides from such damage as being pierced with holes, as a result of oxidation and wear, but also permits each vertical groove formed between each two neighboring ones of the vertical ribs 5,5,5, . . . are brought in contact with the electrode plate P, so that gas generated from the plate P, during charging of the battery, is able to rise straight upward quickly through gas discharge passages 7,7,7, . . . to reach the top open side 4 and readily escape therethrough, thereby bringing about smooth and efficient distribution, diffusion and permeation of the electrolyte into the electrode plate P to ensure and maintain satisfactory battery performance.

Further, because there are provided on the left and right end portions 1a, 1a of the pocket type separator, each of the end portions 1a, 1a being opposite to one of the corner edge portions P1, P2 and P3, P4 of the electrode plate P contained therein, a plurality of short intersectant ribs 6,6,6, . . . arranged in the vertical direction on each side end portion 1a, the separator bases 1a, 1a, that is, the front and rear sheet-made sides 1a, 1a, of the pocket of the separator, are prevented from being contacted directly by the corner edge portions, even when the electrode plate P contained in the separator becomes expanded, widthwise, during use, as indicated by the imaginary lines in FIG. 2, and thus protected from being pierced with holes as a result of the oxidation, undue pressure contact, and wear, In a case where these intersectant ribs 6,6,6, . . . are so arranged that, as shown in FIG. 2, the outer end of each intersectant rib 6 may be formed to adjoin either of the sealed portions 3, 3 on both left and right sides of the separator 1, the strength of both side end portions 2, 2 of the separator 1 is further increased. The protective effect is further enhanced to prevent the side end portions 2, 2 from being pierced with holes even when the electrode plate P becomes further expanded widthwise.

In addition, if the pocket type separator 1 is formed so that there are additional vertical gas discharge passages 7a, 7a between the inner side end of each lineup of the intersectant ribs 6,6,6, . . . and either of the outermost left and right vertical ribs which are opposite thereto, the gas discharge at or along both side end portions 2, 2 of the separator 1 can be performed, resulting in improvement in the gas discharge effect.

Figure 4:
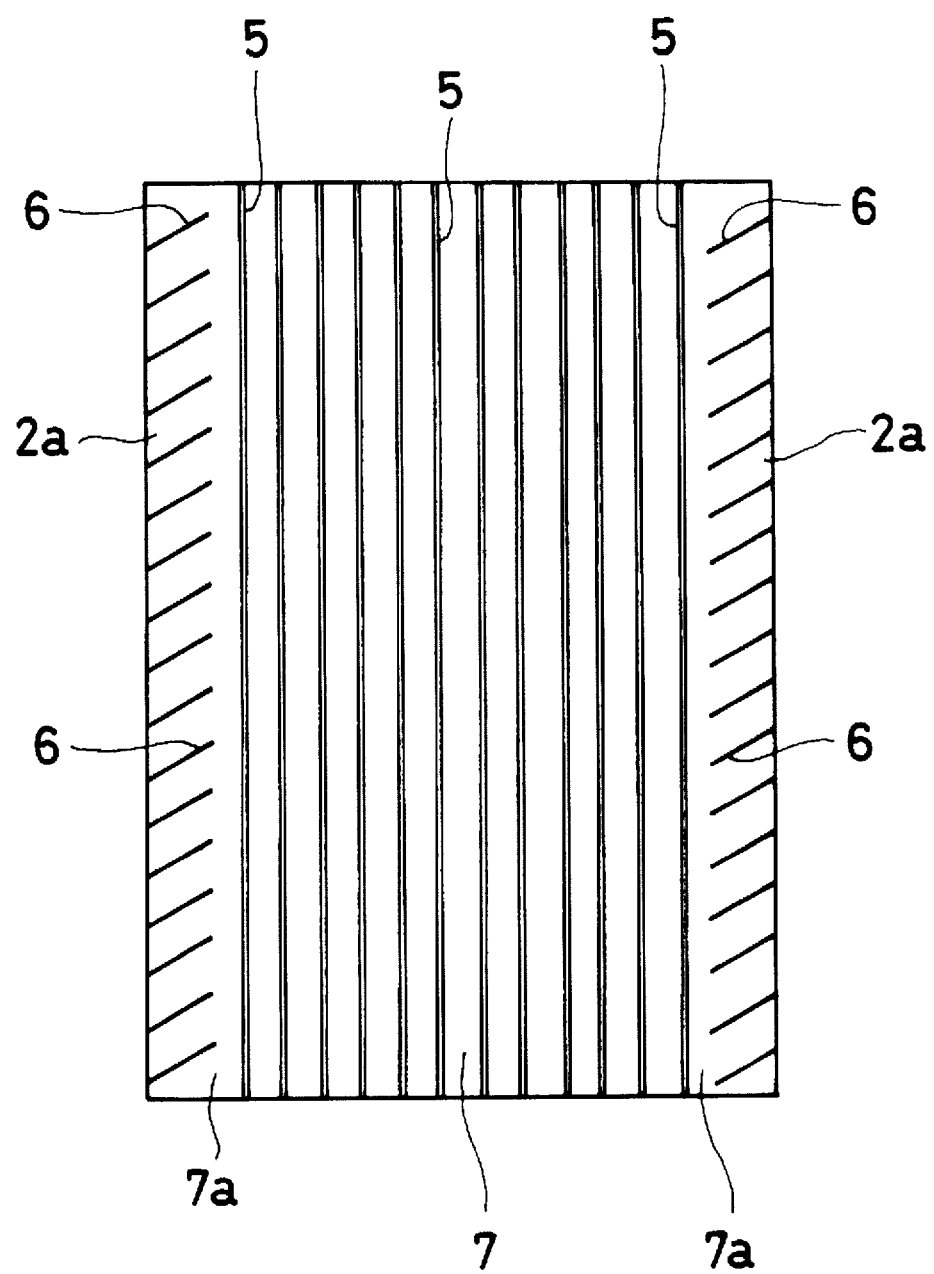
FIG. 4 is a development of another embodiment of the pocket type separator according to the present invention before folding and sealing.

FIG. 4 is a development of another embodying example of the present invention, and shows another embodiment of the pocket type separator, according to the invention, prior to being folded and sealed. As shown in FIG. 4, the intersectant ribs 6,6,6, . . . lined up along both side end portions of the separator 1 according to the present invention, are slanted relative to the horizontal line so that they intersect both side edges P1,P2 and P3,P4 of the electrode plate P on a slant. The gas discharge along the left and right end portions 2, 2 of the pocket type separator 1 becomes easier.

Figure 5:
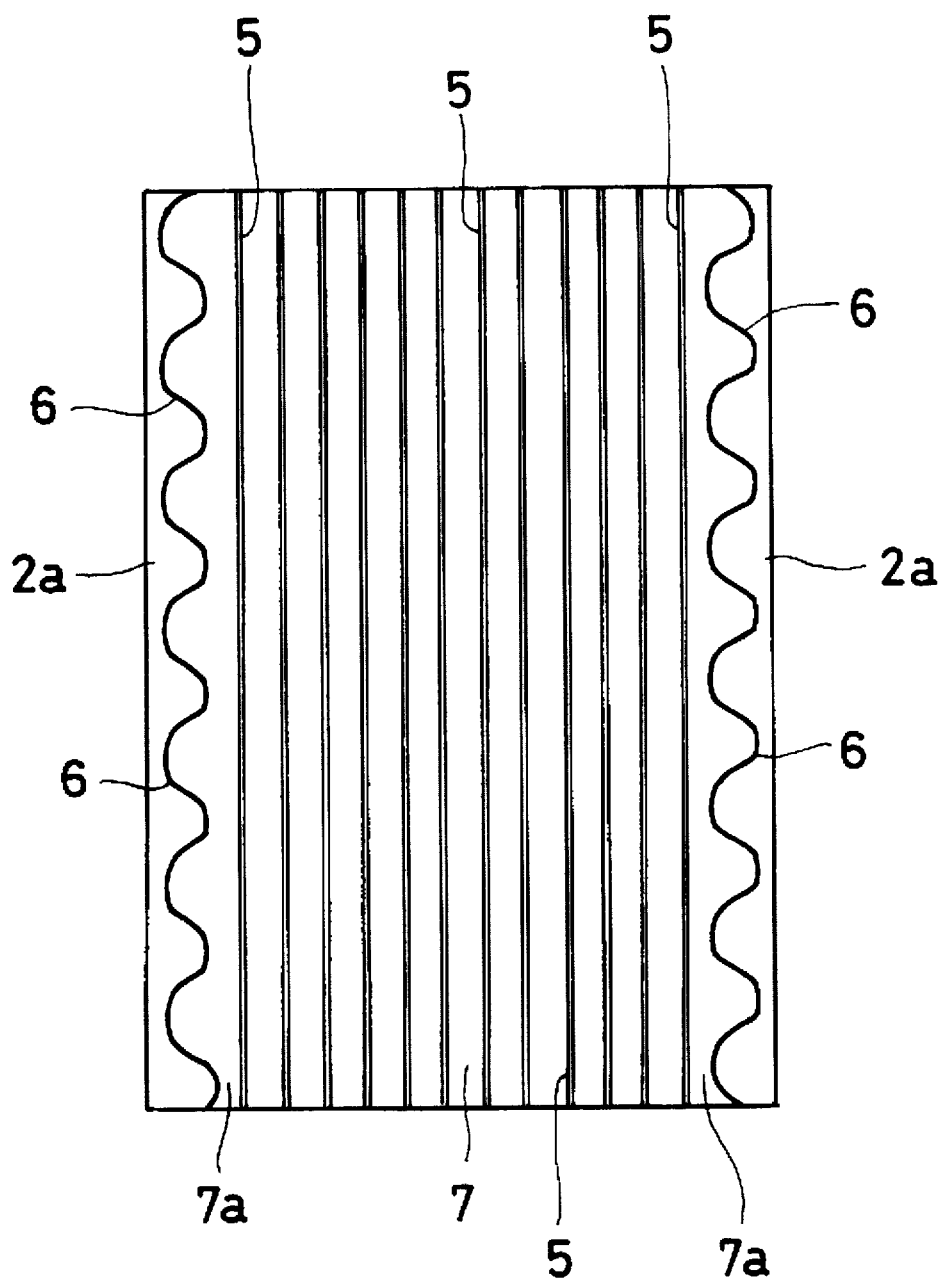
FIG. 5 is a development of a further embodiment of the pocket type separator according to the present invention, also before folding and sealing.

In the aforementioned two embodying examples of the present invention, although the plural intersectant ribs 6,6,6, . . . are made discontinuous with each other and form a discontinuous pattern of ribs, they may be made continuous with each other to be a zigzag or wavelike continuous pattern as shown in FIG. 5.

The pocket type separator, according to the present invention, is provided with a plurality of parallel, vertical ribs arranged on the middle regions of the inner surfaces of the mutually facing front and rear sheet-made sides of the pocket thereof in such a way that they are spaced from each other, in the widthwise direction, and, further, with a plurality of intersectant ribs arranged on both side end portions thereof and spaced in the vertical direction in such a way that they may intersect the front and rear corner edge portions of opposite side edges of the electrode plate contained therein. Therefore, when the positive electrode plate contained in said pocket type separator of the present invention is incorporated in a storage battery, gas generated from the electrode plate is discharged quickly through a plurality of parallel, vertically extending gas discharge passages formed between the vertical ribs and through the top open side of the separator. This arrangement enables the battery to keep the electrode plate in good contact with the electrolyte, at all times, and provide consistently satisfactory performance of the battery, even when the electrode plate becomes expanded or warped during use. The vertical ribs come in contact with opposite side surfaces of the electrode plate and prevent the mid-region portion of the separator bases from being directly contacted by both side surfaces of the electrode plate and, thus, serve to protect the separator bases from damage or deterioration caused by contact and oxidation. The intersectant ribs, arranged to be located on both sides of the vertical rib region come in contact with the front and rear corner edge portions at opposite edges of the electrode plate, especially when the electrode plate becomes expanded. Thus the opposite portions of the separator base are protected from damage or deterioration that otherwise could be caused by contact and oxidation. Breakage of the separator, attributable to an undue pressure contact or thrust, is prevented and the life of the separator is prolonged.

There is another advantageous effect obtainable from the invention. When additional vertical gas discharge passages are formed between the outermost left and right-side vertical ribs and the adjacent lineups of the intersectant ribs found on both sides of the outermost vertical ribs, the gas discharge efficiency is further improved.

Further, when the lined up intersectant ribs are slanted, the gas discharge effect can be further improved.

What is claimed:

1. A pocket separator for an electrode plate of a storage battery, said separator being made of sheet and having opposed front and rear sides, a closed bottom, closed left and right side edges and an open top side, characterized in that inner surfaces of said opposing front and rear sheet-made sides of said pocket separator face opposing side surfaces of an electrode plate when said plate is contained therein and held between said inner surfaces, said inner surfaces of said front and rear sheet-made sides of said pocket each having a plurality of parallel, vertical, widthwise spaced ribs for engaging said opposing side surfaces of said electrode plate contained therein and a plurality of vertically spaced ribs at the inner surfaces of said closed left and right side edge portions of said pocket separator for intersecting and engaging corner edge portions of opposite side edges of said electrode plate contained in said pocket separator.

2. A pocket separator as claimed in claim 1, wherein gas discharge passages are formed between the outermost of said left and right vertical ribs and said plurality of vertically spaced, ribs.

3. A pocket type separator as claimed in any one of claims 1 and 2, wherein said plurality of vertically spaced, ribs are slanted.

* * * * *